US009897786B2

(12) United States Patent
Yin et al.

(10) Patent No.: US 9,897,786 B2
(45) Date of Patent: Feb. 20, 2018

(54) TWO-SURFACE NARROW FIELD-OF-VIEW COMPOUNDS LENS

(71) Applicant: OmniVision Technologies, Inc., Santa Clara, CA (US)

(72) Inventors: Chuen-Yi Yin, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 182 days.

(21) Appl. No.: 14/875,173

(22) Filed: Oct. 5, 2015

(65) Prior Publication Data
US 2017/0097491 A1 Apr. 6, 2017

(51) Int. Cl.
*G02B 9/00* (2006.01)
*G02B 13/00* (2006.01)
*G02B 9/02* (2006.01)

(52) U.S. Cl.
CPC ............ *G02B 13/006* (2013.01); *G02B 9/02* (2013.01); *G02B 13/0025* (2013.01); *G02B 13/0085* (2013.01)

(58) Field of Classification Search
CPC .... G02B 13/006; G02B 9/02; G02B 13/0025; G02B 13/085
See application file for complete search history.

(56) References Cited

U.S. PATENT DOCUMENTS 7,841,785 B2 * 11/2010 Hirao ................ G02B 13/0025
359/740

FOREIGN PATENT DOCUMENTS

| CN | 101606095 A | 12/2009 |
| CN | 101939682 A | 1/2011 |
| JP | 2015038538 A | 2/2015 |
| TW | 201417761 A | 5/2014 |

OTHER PUBLICATIONS

Office Action corresponding to Taiwanese Patent Application No. 105129868, dated Dec. 8, 2017, 9 pages.

* cited by examiner

*Primary Examiner* — Joseph P Martinez
(74) *Attorney, Agent, or Firm* — Lathrop Gage LLP

(57) ABSTRACT

A two-surface narrow field-of-view (FOV) compound lens for producing an image of an object at an image plane of an imaging system includes a biplanar substrate between a plano-convex lens and a plano-concave lens having a common optical axis. The plano-convex lens has a first planar surface on a first side of the biplanar substrate and is formed of a material having a first Abbe number. The plano-concave lens has a second planar surface on a second side of the biplanar substrate opposite the first side, and is formed of a material having a second Abbe number less than the first Abbe number. The first and second lens have respective focal lengths F1 and F2 that may satisfy $-1.4 < F2/F1 < -0.9$. The compound lens may have a total track length T and an effective focal length $f_{eff}$ such that their ratio satisfies $0.88 < T/f_{eff} < 0.98$.

20 Claims, 14 Drawing Sheets

| | 421 | 422 | 423 | 424 | 425 | 426 | 404 | 406 | 408 | 410 | 412 |
|---|---|---|---|---|---|---|---|---|---|---|---|
| | | radius $r_c$ (mm) | thickness (mm) | $n_d$ ($\lambda$=587.3 nm) | Abbe Number | conic $k$ | aspheric coefficient | | | | |
| | surface | | | | | | 4th-order term $a_4$ | 6th-order term $a_6$ | 8th-order term $a_8$ | 10th-order term $a_{10}$ | 12th-order term $a_{12}$ |
| | 311 | 0.888 | 0.330 | 1.511 | 57 | -0.0631 | -0.1594 | 1.0286 | -2.3746 | 2.3955 | 0.0000 |
| | 312 | ∞ | 0.000 | -- | -- | -- | -- | -- | -- | -- | -- |
| | 321 | ∞ | 0.300 | 1.517 | 63 | -- | -- | -- | -- | -- | -- |
| | 322 | ∞ | 0.000 | -- | -- | -- | -- | -- | -- | -- | -- |
| | 331 | ∞ | 0.027 | 1.595 | 30 | -- | -- | -- | -- | -- | -- |
| | 332 | 1.105 | 4.120 | -- | -- | 0.3049 | -0.2701 | 5.6164 | -29.0041 | 86.6752 | -92.4739 |
| | 351 | ∞ | 0.400 | 1.517 | 63 | -- | -- | -- | -- | -- | -- |
| | 352 | ∞ | 0.040 | -- | -- | -- | -- | -- | -- | -- | -- |
| | 378 | ∞ | 0.000 | -- | -- | -- | -- | -- | -- | -- | -- |

| surface | radius $r_c$ (mm) | thickness (mm) | $n_d$ ($\lambda$=587.3 nm) | Abbe Number | conic $k$ | aspheric coefficient | | | | |
|---|---|---|---|---|---|---|---|---|---|---|
| | | | | | | 4th-order term $\alpha_4$ | 6th-order term $\alpha_6$ | 8th-order term $\alpha_8$ | 10th-order term $\alpha_{10}$ | 12th-order term $\alpha_{12}$ |
| 911 | 0.928 | 0.300 | 1.511 | 57 | 0.4316 | -0.0291 | 0.0210 | -0.0271 | -0.3260 | 0.0000 |
| 912 | ∞ | 0.000 | -- | -- | -- | -- | -- | -- | -- | -- |
| 921 | ∞ | 0.300 | 1.517 | 63 | -- | -- | -- | -- | -- | -- |
| 922 | ∞ | 0.000 | -- | -- | -- | -- | -- | -- | -- | -- |
| 931 | ∞ | 0.027 | 1.595 | 30 | -- | -- | -- | -- | -- | -- |
| 932 | 1.358 | 3.302 | -- | -- | 2.8362 | 0.0803 | 1.1053 | -5.2606 | 18.5022 | -14.7969 |
| 951 | ∞ | 0.400 | 1.517 | 63 | -- | -- | -- | -- | -- | -- |
| 952 | ∞ | 0.040 | -- | -- | -- | -- | -- | -- | -- | -- |
| 978 | ∞ | -- | -- | -- | -- | -- | -- | -- | -- | -- |

TWO-SURFACE NARROW FIELD-OF-VIEW COMPOUNDS LENS

BACKGROUND

Digital camera modules are used in a variety of consumer, industrial and scientific imaging devices to produce still images and/or video. Applications of digital camera modules include image-based recognition applications such as barcode scanning and iris recognition. A camera for such applications may include an imaging lens with relatively large depth of field compared to conventional lenses. Such a large depth of field enables a device using the camera to recognize an object to be relatively insensitive to the object's distance from the imaging lens.

For a fixed imaging lens focal length, the depth of field of the imaging lens is approximately linearly proportional to the lens's f-number N, where N is the ratio of the lens's effective focal length to its entrance pupil diameter D. See, for example, The Manual of Photography, 9th ed. by Jacobson et al, Focal Press, 2000. The field of view 2α of a camera with an imaging lens having focal length f and an image sensor with diagonal length d is $$2\alpha = 2\arctan\left(\frac{d}{2f}\right).$$

Expressed in terms of f-number N=f/D, $$\alpha = 2\arctan\left(\frac{d}{2D \cdot N}\right),$$

which illustrates that for a constant entrance pupil diameter D, field of view a decreases as f-number N increases. Since depth of field is approximately linearly proportional to the lens's f-number N, field of view 2α also decreases as depth of field increases.

Image-based recognition devices require a camera module having a lens with a smaller field of view (FOV) than lenses in conventional camera modules, while producing images with line-width resolution minimally reduced compared to images formed by conventional camera modules.

Conventional narrow-FOV camera modules achieve a small point of view while maintaining image quality of a larger FOV camera by employing telescope-like compound lenses that include several optical surfaces. A disadvantage of such camera modules is that the manufacturing cost of a compound lens increases with number of optical surfaces.

SUMMARY OF THE INVENTION

A two-surface narrow field-of-view (FOV) compound lens for producing an image of an object at an image plane of an imaging system is disclosed. In an embodiment, the lens includes a biplanar substrate between a plano-convex lens and a plano-concave lens having a common optical axis. The plano-convex lens has a first planar surface on a first side of the biplanar substrate and is formed of a material having a first Abbe number. The plano-concave lens has a second planar surface on a second side of the biplanar substrate opposite the first side, and is formed of a material having a second Abbe number less than the first Abbe number.

In an embodiment, the first Abbe number exceeds 50 and the second Abbe number being less than 35. In an embodiment, the biplanar substrate is formed of a material having a third Abbe number that exceeds the second Abbe number. In an embodiment, the plano-convex lens has a focal length F1, the plano-concave lens has a focal length F2, the ratio F2/F1 satisfying −1.4<F2/F1<−0.9. In an embodiment, the biplanar substrate, the plano-convex lens and the plano-concave lens collectively have an effective focal length F such that the image is formed at the image plane located a distance T from an intersection of the optical axis and an object-side convex surface of the plano-convex lens, and the ratio T/F satisfies 0.88<T/F<0.98.

BRIEF DESCRIPTION OF THE FIGURES

FIG. 4 shows a table of exemplary parameters of the compound lens of FIG. 3.

DETAILED DESCRIPTION

Figure 1:
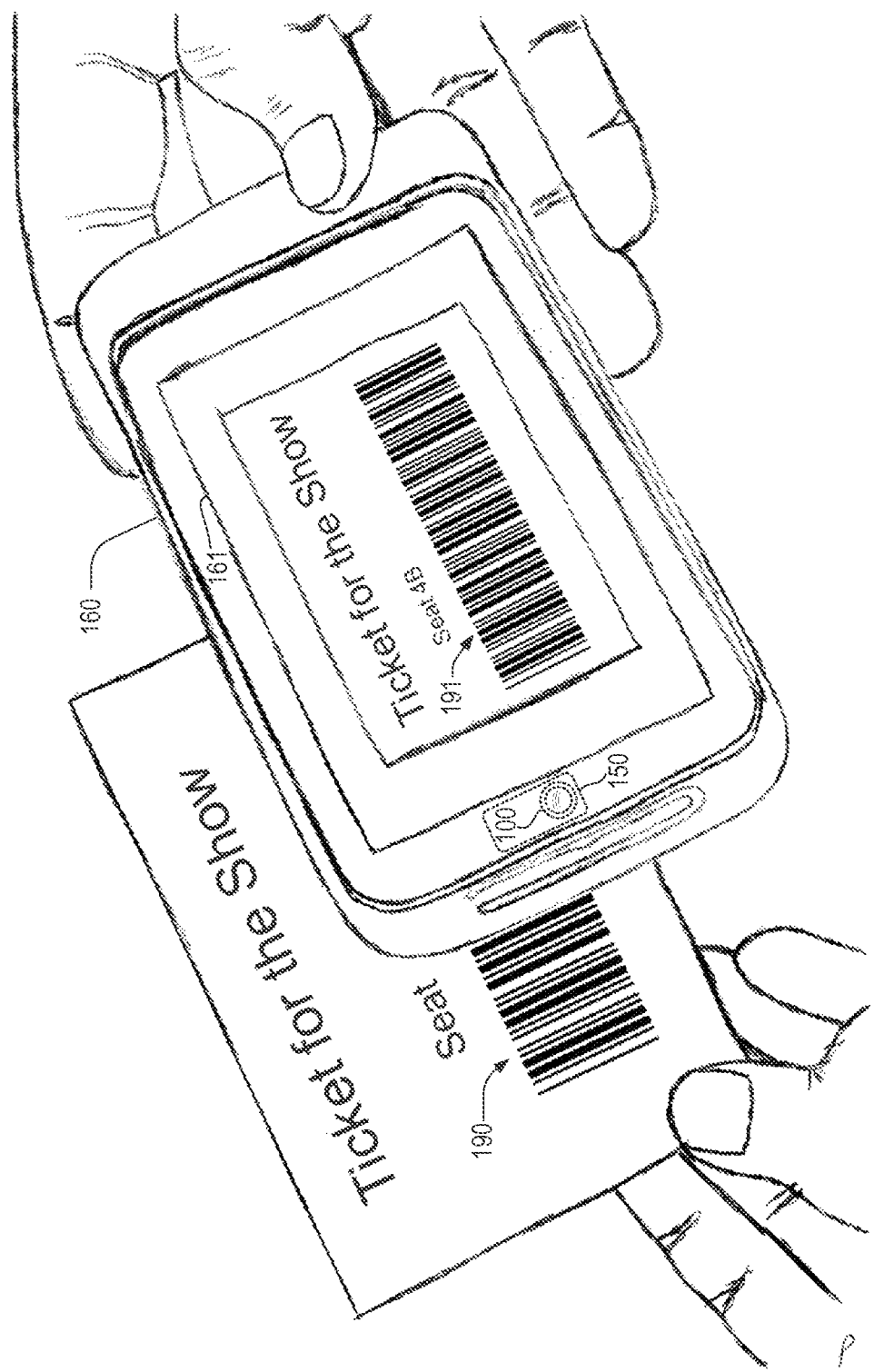
FIG. 1 illustrates an exemplary narrow field-of-view compound lens in a use scenario, according to an embodiment.

FIG. 1 illustrates the imaging of a barcode 190 with a narrow field-of-view compound lens 100 within a camera module 150 of a mobile device 160. Camera module 150 and compound lens 100 are depicted with dashed lines because they are visible on a side of mobile device 160 facing barcode 190. An image 191 of barcode 190 is shown on output display 161 of mobile device 160. It should be appreciated that narrow field-of-view compound lens 100 may be included in alternate locations on the mobile device 160, such as on the front, back, top, bottom or sides of the device 160. Furthermore, narrow field-of-view compound lens 100 may be included on other devices including, but not limited to, laptop computers, tablet computers, barcode scanners, and image-based recognition devices without departing from the scope hereof.

Figure 2:
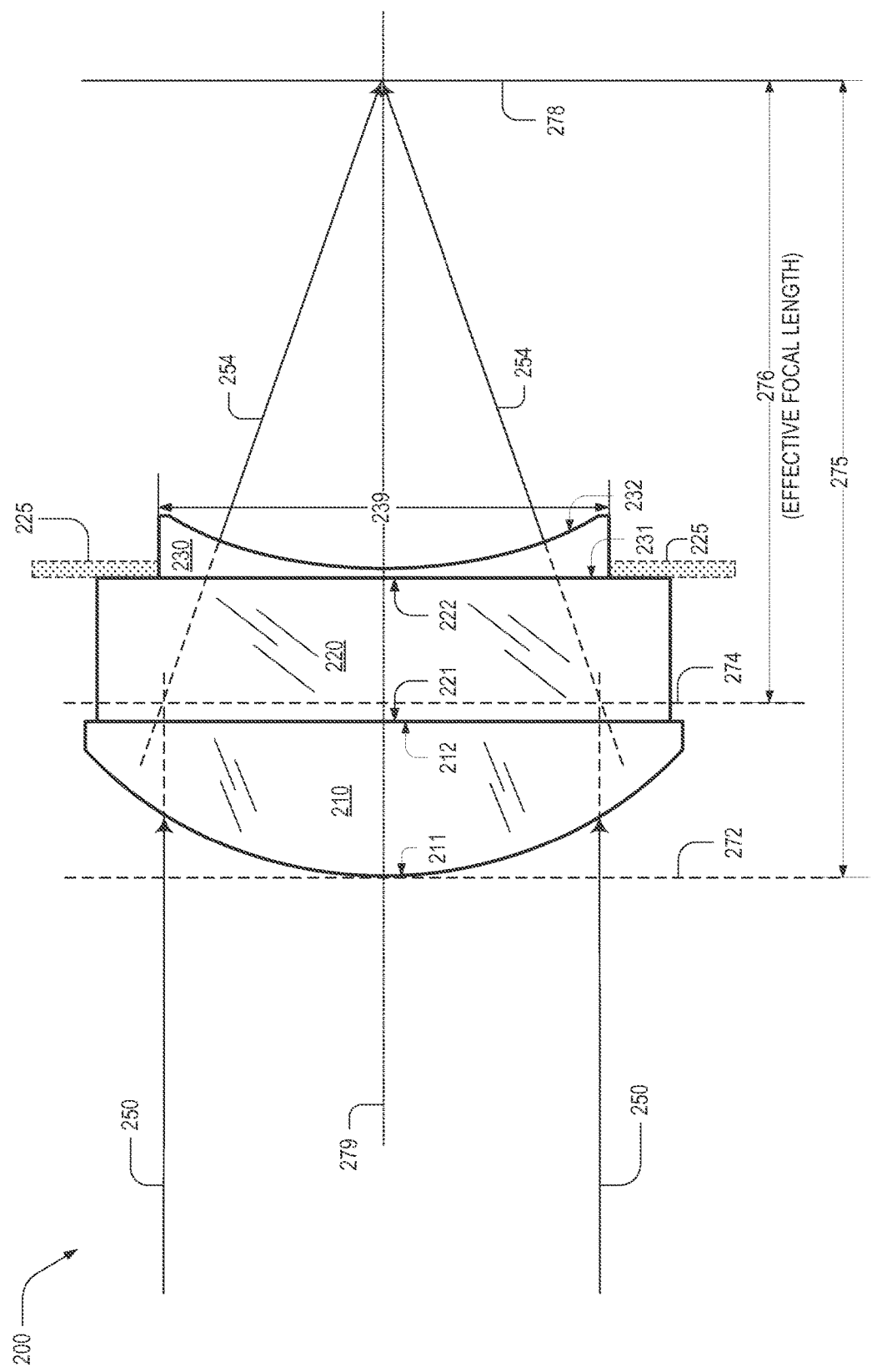
FIG. 2 is an exemplary cross-sectional view of an embodiment of the two-surface narrow field-of-view compound lens of FIG. 1.

FIG. 2 is a cross-sectional view of a two-surface narrow field-of-view compound lens 200, which is an embodiment of two-surface narrow field-of-view compound lens 100 of FIG. 1. Compound lens 200 includes a substrate 220 between a plano-convex lens 210 and a plano-concave lens 230. Plano-convex lens 210 and plano-concave lens 230 share a common optical axis 279, and are hence coaxial. Substrate 220 may be either monolithic, or alternatively be formed of more than one optical element.

Plano-convex lens 210 includes a convex surface 211 and a planar surface 212. Planar surface 212 adjoins a planar surface 221 of substrate 220, which also includes a planar surface 222 opposing the planar surface 221. Planar surface 222 adjoins a planar surface 231 of plano-concave lens 230, which also includes a concave surface 232 opposing the planar surface 231. At least one of surfaces 211 and 232 may be aspheric. At least one of surfaces 211 and 232 may be spherical without departing from the scope hereof. Surfaces 212 and 221 are shown being in direct contact with each other, but may be indirectly adjoined, via an additional optical element, without departing from the scope hereof. Likewise, surfaces 222 and 231 are shown being in direct contact with each other, but may be indirectly adjoined without departing from the scope hereof.

Plano-convex lens 210 and plano-concave lens 230 may each be singlet lenses. In an embodiment of compound lens 200, at least one of plano-convex lens 210 and plano-concave lens 230 may be non-singlet lenses without departing from the scope hereof.

Surface 211 of plano-convex lens 210 may be optimized to collect incident rays, control the propagation direction of those rays into compound lens 200, such as through lenses 220 and 230, and guide the incident rays passing through an aperture stop 225. Surface 232 of plano-concave lens 230 may be optimized to correct chromatic aberration and spherical aberration of an image formed by compound lens 200. In FIG. 2, aperture stop 225 is illustrated as a physical aperture for illustrative purposes only. Without departing from the scope hereof, aperture stop 225 may be a non-physical aperture, that is, formed at least in-part by an element other than lenses 210, 230, and substrate 220.

Used in an imaging system, compound lens 200 may have aperture stop 225 between substrate 220 and plano-concave lens 230, which corresponds to a plane between adjoining surfaces 222 and 231. Locating aperture stop 225 within compound lens 200 helps to maintain symmetry of ray cones from field coordinates, which decreases selected aberrations and contributes to the imaging system having an optimal modulation transfer function ("MTF").

Plano-convex lens 210 has a focal length F1 and plano-concave lens 230 has a focal length F2. Embodiments of compound lens 200 may have a quotient F2/F1 between −1.4 and −0.9. Limiting the quotient F2/F1 to this range allows for limiting chromatic and spherical aberration in an image formed by compound lens 200 to values that may be adequately corrected for effective image-based recognition. Images formed by a lens with quotient F2/F1 outside of this range have chromatic and spherical aberrations that exceed a threshold beyond which the aberrations cannot be adequately corrected for effective image-based recognition.

FIG. 2 shows compound lens 200 focusing parallel rays 250 onto an image plane 278. Converging rays 254 exit compound lens 200 and converge at image plane 278. Extensions of rays 250 and 254 into compound lens 200 intersect at a principal plane 274. FIG. 2 shows principal plane 274 is intersecting compound lens 200. Without departing from the scope here of, embodiments of compound lens 200 may have principal plane 274 located such that it does not intersect compound lens 200.

Compound lens 200 has an effective focal length 276 (herein also denoted by $f_{eff}$), between principal plane 274 and image plane 278. A plane 272 is tangent to surface 211 at optical axis 279 and perpendicular to optical axis 279. Total track length 275 defines a distance T between plane 272 and image plane 278. Embodiments of compound lens 200 may have a quotient $T/f_{eff}$ between 0.88 and 0.98. Limiting the quotient $T/f_{eff}$ to this range limits total track length 275 and the length of an imaging system that includes compound lens 200.

In compound lens 200, plano-convex lens 210 has an Abbe number $V_d > 50$ and plano-concave lens 230 has an Abbe number $V_d < 35$. These constraints on Abbe numbers allow for limiting chromatic aberration in imaging systems that include compound lens 200, such as imaging systems 301 and 901 discussed herein, to values that may be adequately corrected for effective image-based recognition. Images formed by a lenses Abbe numbers outside of this range have chromatic aberration that exceeds a threshold beyond which the aberration cannot be adequately corrected for effective image-based recognition. Herein, all refractive index values and Abbe numbers correspond to $\lambda_d = 587.6$ nm unless otherwise specified.

Transparent optical materials with $V_d > 50$ include polymethyl methacrylate (PMMA), alicyclic acrylate (e.g., Optrez OZ1330®), and cycloolefin polymers (e.g., APEL™ 5014 DP, TOPAS® 5013, and ZEONEX® 480R). The lens material with $V_d > 50$ may be plastic, glass, or any non-plastic optical material without departing from the scope hereof.

Transparent optical materials with $V_d < 35$ include PAN-LITE®, a brand-name polycarbonate, Udel® P-1700, a brand-name polysulfone, and OKP-4, a brand-name optical polyester. The lens material with $V_d < 35$ may be plastic, glass, or any non-plastic optical material without departing from the scope hereof.

Lenses 210 and 230 may be formed of a solder-reflow compatible material via a wafer-level optics replication process. Lenses 210 and 230 may also be formed via injection molding or other methods known in the art. Alternatively, lenses 210 and 230 may be formed of glass via precision glass molding (also known as ultra-precision glass pressing) or other methods known in the art.

Two-surface Narrow Field-of-view Compound Lens, Example 1

Figure 3:
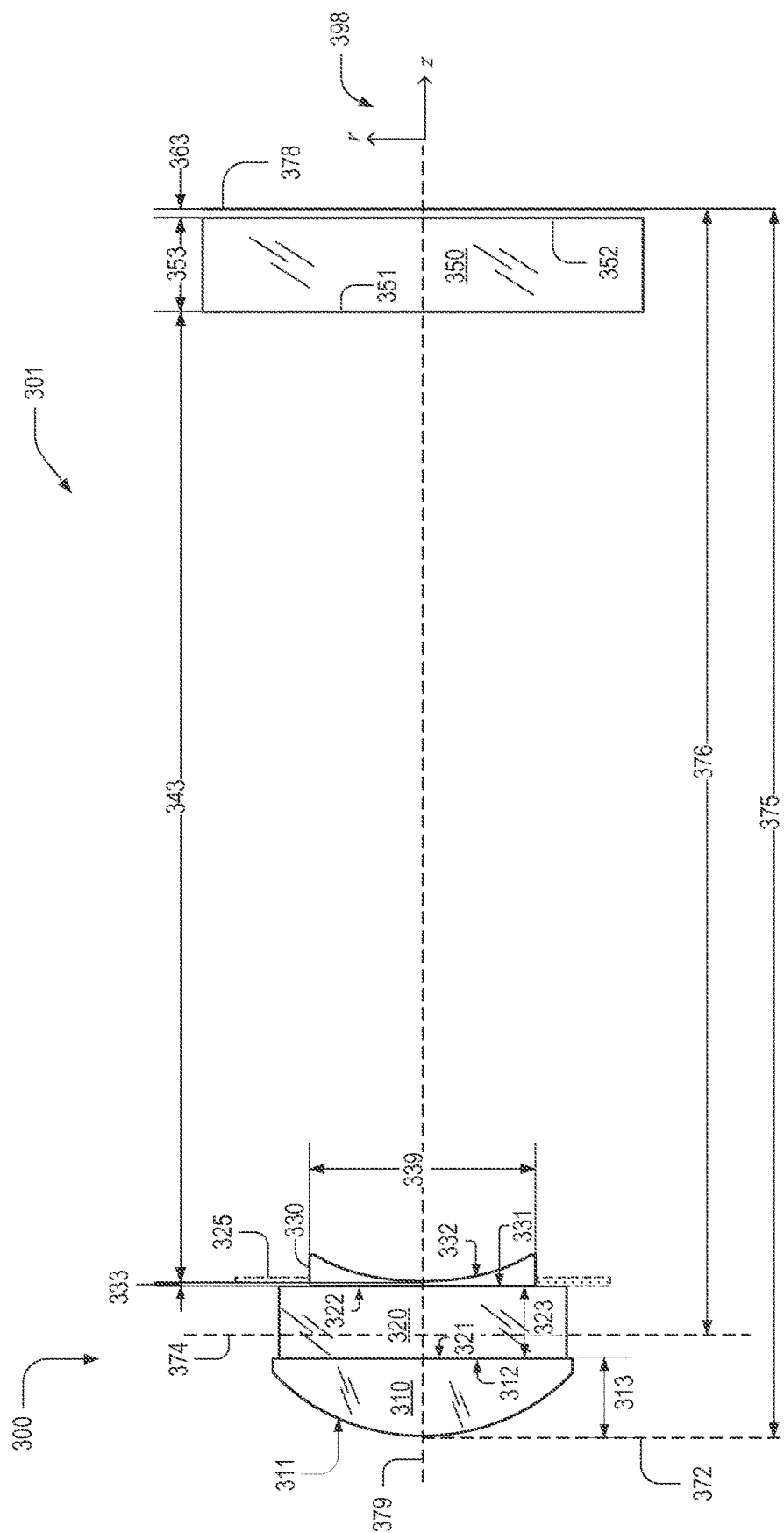
FIG. 3 is a cross-sectional view of an imaging system showing an embodiment of the two-surface narrow field-of-view compound lens, of FIGS. 1 and 2, in relationship to a coverglass of an imager.

FIG. 3 is a cross-sectional view of a two-surface narrow field-of-view compound lens 300 within an imaging system 301. Compound lens 300 is an embodiment of two-surface narrow field-of-view compound lens 200. Compound lens 300 includes a substrate 320 between a plano-convex lens 310 and a plano-concave lens 330. Substrate 320, plano-convex lens 310, and plano-concave lens 330 are embodiments of substrate 220, plano-convex lens 210, and plano-concave lens 230, respectively, of compound lens 200. Plano-convex lens 310 and plano-concave lens 330 have a common optical axis 379 and are thus coaxial. Compound lens 300 has an aperture stop 325 resulting from diameter 339 of lens 330. Aperture stop 325 and diameter 339 are similar to aperture stop 225 and diameter 239 of compound lens 200. Diameter 339 equals 0.936 mm.

Plano-convex lens 310 includes a convex surface 311 and a planar surface 312. Planar surface 312 adjoins a planar surface 321 of substrate 320, which also includes a planar surface planar surface 322. Planar surface 322 adjoins a planar surface 331 of plano-concave lens 330, which also includes a concave surface 332. Surfaces 311, 312, 321, 322, 331, and 332 are embodiments of surfaces 211, 212, 221, 222, 231, and 232, respectively.

In addition to including compound lens 300, imaging system 301 may also include a cover glass 350. Cover glass 350 includes surfaces 351 and 352 and covers a pixel array of an image sensor, not shown, located at image plane 378. The specific type of pixel array and image sensor may vary and is thus not discussed in detail herein.

FIG. 4 shows a table 400 of exemplary parameters of each surface of compound lens 300. Table 400 includes columns 404, 406, 408, 410, 412, and 421-426. Surface column 421 denotes surfaces 311, 312, 321, 322, 331, 332, 351, 352, and image plane 378 shown in FIG. 3. Column 423 includes on-axis thickness values, in millimeters, between adjacent surfaces of imaging system 301. Column 423 includes center thicknesses of lens 310, substrate 320, lens 330, and cover glass 350. Specifically, lens 310 has a center thickness 313 equal to 0.33 mm, substrate 320 has a center thickness 323 equal to 0.30 mm, lens 330 has a center thickness 333, and cover glass 350 has a center thickness 353 equal to 0.40 mm. Surface 332 of plano-concave lens 330 and surface 351 of cover glass 350 are separated by a distance 343 equal to 4.120 mm.

It should be appreciated that imaging system 301 need not include cover glass 350, in which case parameters of compound lens 300 may be reoptimized to form an image at image plane 378 absent cover glass 350. Surface 352 and image plane 363 are separated by a distance 363 equal to 0.040 mm.

Surfaces 311 and 332 are defined by surface sag $z_{sag}$, Eqn. 1.

$$z_{sag} = \frac{cr^2}{1+\sqrt{1-(1+k)c^2r^2}} + \sum_{i=2}^{N} \alpha_{2i}r^{2i} \quad (1)$$

In Eqn. 1, $z_{sag}$ is a function of radial coordinate r, where directions z and r are shown in coordinate axes 398, FIG. 3. Quantity i is a positive integer and N=6. In Eqn. 1, the parameter c is the reciprocal of the surface radius of curvature $$r_c: c = \frac{1}{r_c}.$$

Column 422 of FIG. 4 lists $r_c$ values for surfaces 311 and 332. Parameter k denotes the conic constant, shown in column 426. Columns 404, 406, 408, 410, and 412 contain values of aspheric coefficients $\alpha_4$, $\alpha_6$, $\alpha_8$, $\alpha_{10}$, and $\alpha_{12}$, respectively. The units of quantities in FIG. 3 are consistent with $z_{sag}$ in Eqn. 1 being expressed in millimeters.

Column 424 lists the material's refractive index $n_d$ at free-space wavelength $\lambda$=587.6 nm, and column 425 lists the corresponding Abbe numbers $V_d$. Plano-convex lens 310 has refractive index $n_d$=1.511, Abbe number $V_d$=57, and includes object-side surface 311 and image-side surface 312. Substrate 320 has refractive index $n_d$=1.517, Abbe number $V_d$=63, and includes object-side surface 321 and image-side surface 322. Plano-concave lens 330 has refractive index $n_d$=1.595, Abbe number $V_d$=30, and includes object-side surface 331 and image-side surface 332.

Compound lens 300 has a total track length 375 equal to 5.217 mm, which is the sum of thickness values in column 423 of table 400. Referring to FIG. 3, total track length 375 is between plane 372 and image plane 378, where plane 372 is tangent to surface 311 at optical axis 379. At free-space wavelength $\lambda$=587.6 nm, compound lens 300 has an effective focal length 376 ($f_{eff}$) equal to 5.706 mm between a principal plane 374 and image plane 378. Principal plane 374, total track length 375 and effective focal length 376 are similar to principal plane 274, total track length 275 and effective focal length 276, respectively. The ratio of total track length 375 to effective focal length 376 equals 0.914. Compound lens 300 has a working f-number equal to 4.8 and, for an image sensor with a 1.7-mm diagonal length, a 16-degree field of view.

Plano-convex lens 310 and plano-concave lens 330 have focal lengths F1 and F2 respectively, which may be approximated using the lensmaker's equation. Referring to plano-convex lens 310, object-side surface 311 has a 0.888-mm radius of curvature, and image-side surface 312 is planar hence has an infinite radius of curvature. Using these radii of curvature, center thickness 313, and $n_d$=1.511, the lensmaker's equation yields F1≈1.738 mm. Referring to plano-concave lens 330, object-side surface 331 is planar and hence has an infinite radius of curvature, and image-side surface 332 has a radius of curvature R4=1.105. Using these radii of curvature, center thickness 333, and $n_d$=1.595, the lensmaker's equation yields F2≈−1.857 mm. Ratio F2/F1≈−1.069.

FIGS. 5-8 are plots of longitudinal aberration, f-theta distortion, field curvature, and lateral color, respectively, of compound lens 300 within imaging system 301 as computed by Zemax®.

Figure 5:
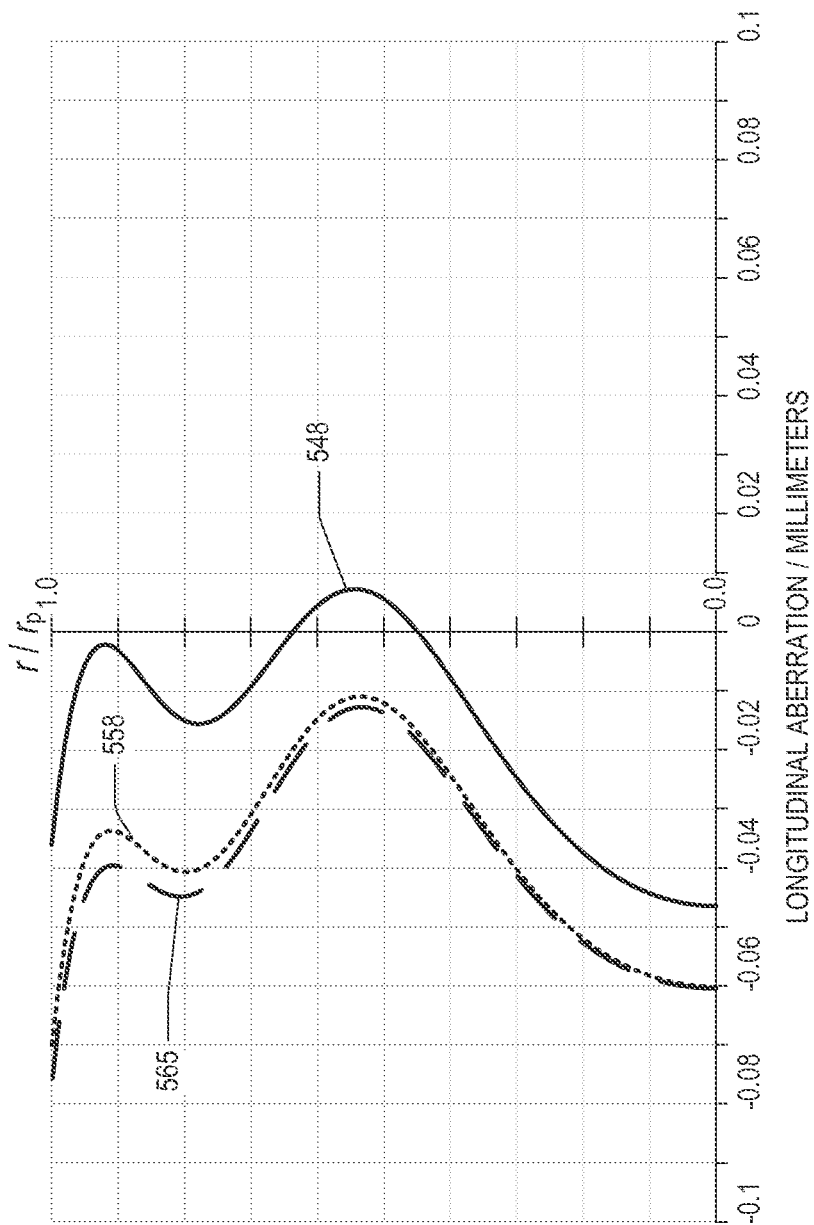
FIG. 5 is a plot of the longitudinal aberration of the compound lens within the imaging system of FIG. 3.

FIG. 5 is a plot of the longitudinal aberration of compound lens 300 within imaging system 301. In FIG. 5, longitudinal aberration is plotted in units of millimeters as a function of normalized radial coordinate $r/r_p$, where $r_p$=0.6334 mm is the maximum entrance pupil radius. Longitudinal aberration curves 548, 558, and 565 are computed at the blue, green, and red Fraunhofer F-, d- and C-spectral lines: $\lambda_F$=486.1 nm, $\lambda_d$=587.6 nm, and $\lambda_C$=656.3 nm respectively.

Figure 6:
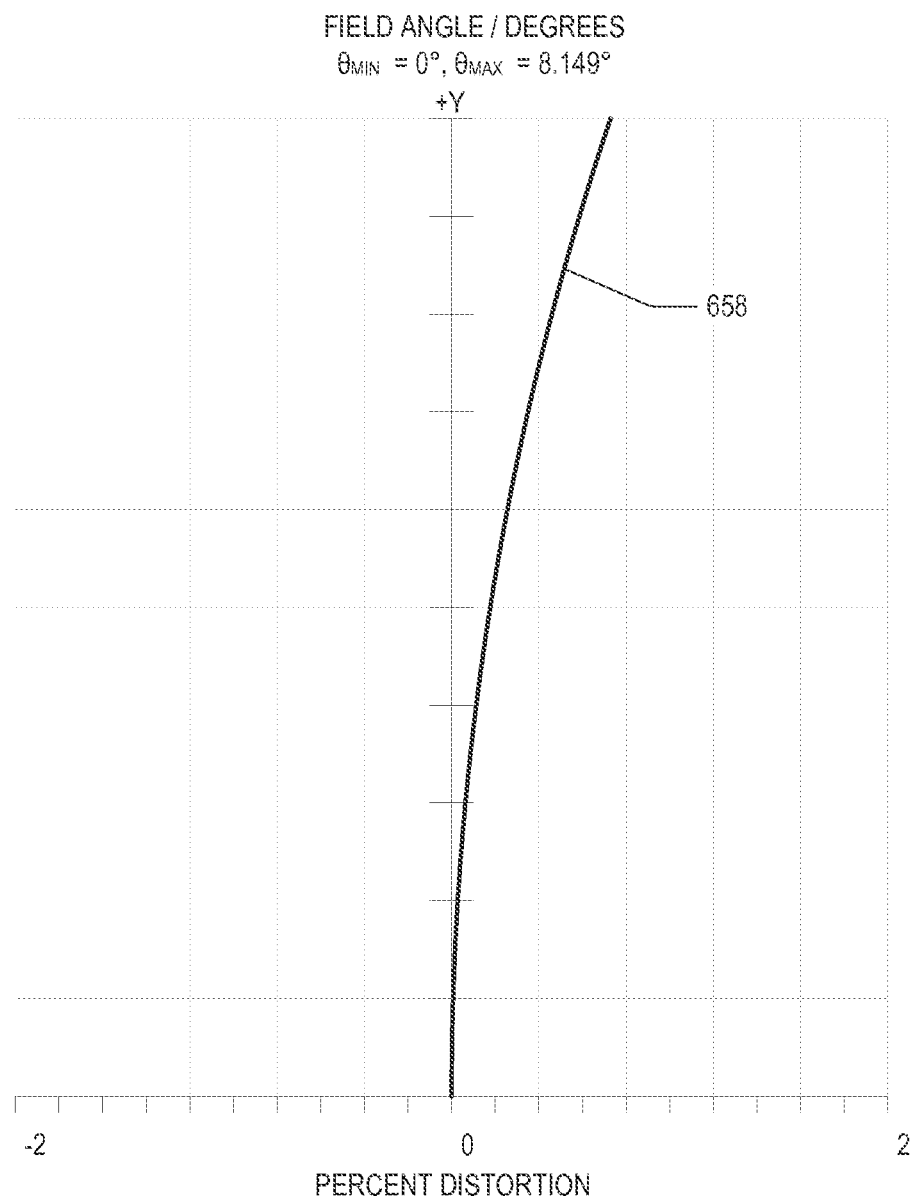
FIG. 6 is a plot of the f-theta distortion of the compound lens within the imaging system of FIG. 3.

FIG. 6 is a plot of the f-theta distortion, versus field angle, of compound lens 300 within imaging system 301. The maximum field angle plotted in FIG. 6 is $\theta_{max}$=8.149°. Distortion curve 658 is computed at wavelength $\lambda_d$. For clarity, distortion curves corresponding to wavelength $\lambda_F$ and $\lambda_C$ are not shown, as they overlap distortion curve 658 to within its line thickness as plotted in FIG. 6.

Figure 7:
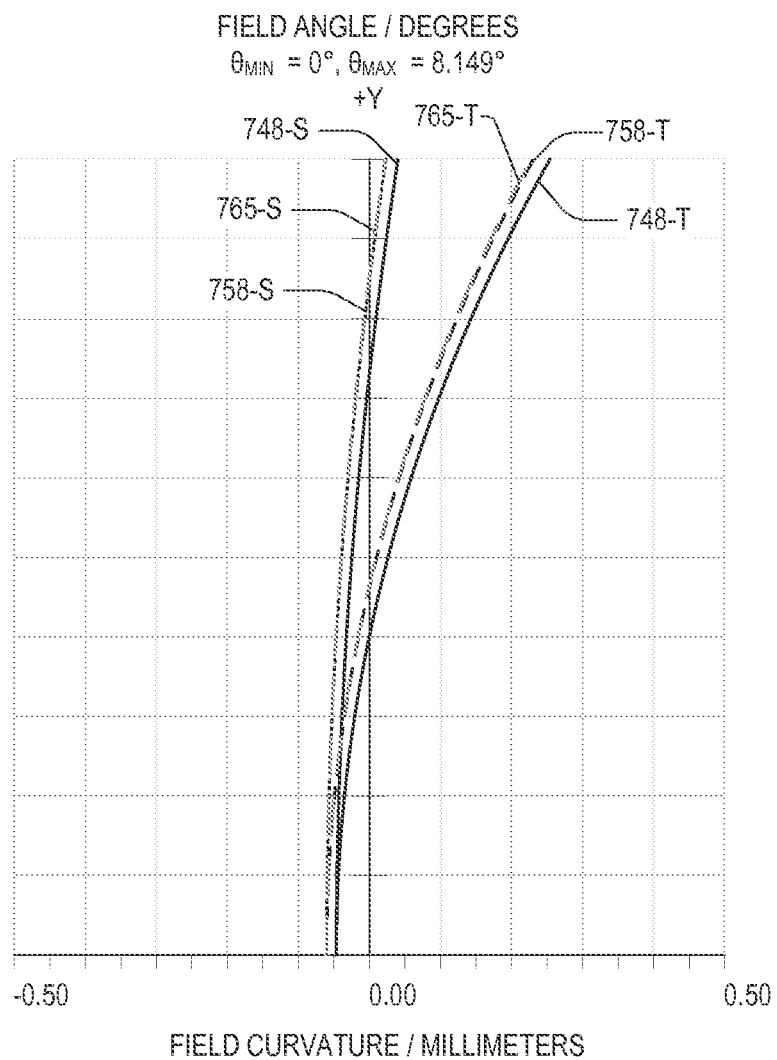
FIG. 7 is a plot of the Petzval field curvature of the compound lens within the imaging system of FIG. 3.

FIG. 7 is a plot of the Petzval field curvature, as a function of field angle, of compound lens 300 within imaging system 301. The field curvature is plotted for field angles between zero and $\theta_{max}$=8.149°. Field curvature 748-S and field curvature 748-T (solid lines) are computed at wavelength $\lambda_F$ in the sagittal and tangential planes, respectively. Field curvature 758-S and field curvature 758-T (short-dashed lines) are computed at wavelength $\lambda_d$ in the sagittal and tangential planes, respectively. Field curvature 765-S and field curvature 765-T (long-dashed lines) correspond to field curvature at wavelength $\lambda_C$ in the sagittal and tangential planes, respectively.

Figure 8:
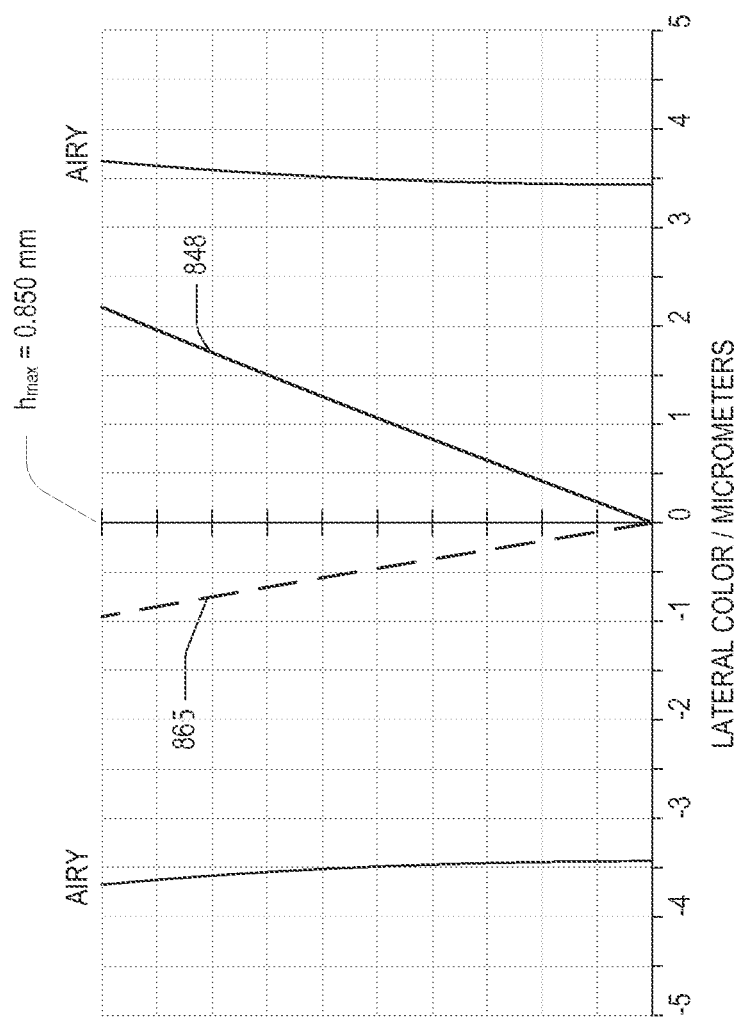
FIG. 8 is a plot of the lateral color error of the compound lens within the imaging system of FIG. 3.

FIG. 8 is a plot of the lateral color error, also known as transverse chromatic aberration, versus field height of compound lens 300 within imaging system 301. Field height ranges from $h_{min}$=0 (on-axis) to $h_{max}$=0.850 mm in image plane 378 Lateral color is referenced to the yellow d Fraunhofer line of helium, $\lambda_d$=587.6 nm such that lateral color for $\lambda_d$ is zero for all field heights. Lateral color 848 is computed at wavelength 4. Lateral color 865 is computed at wavelength $\lambda_C$. The lateral color error is less than the Airy disk radius for the range of field heights evaluated.

Two-surface Narrow Field-of-view Compound Lens, Example 2

Figure 9:
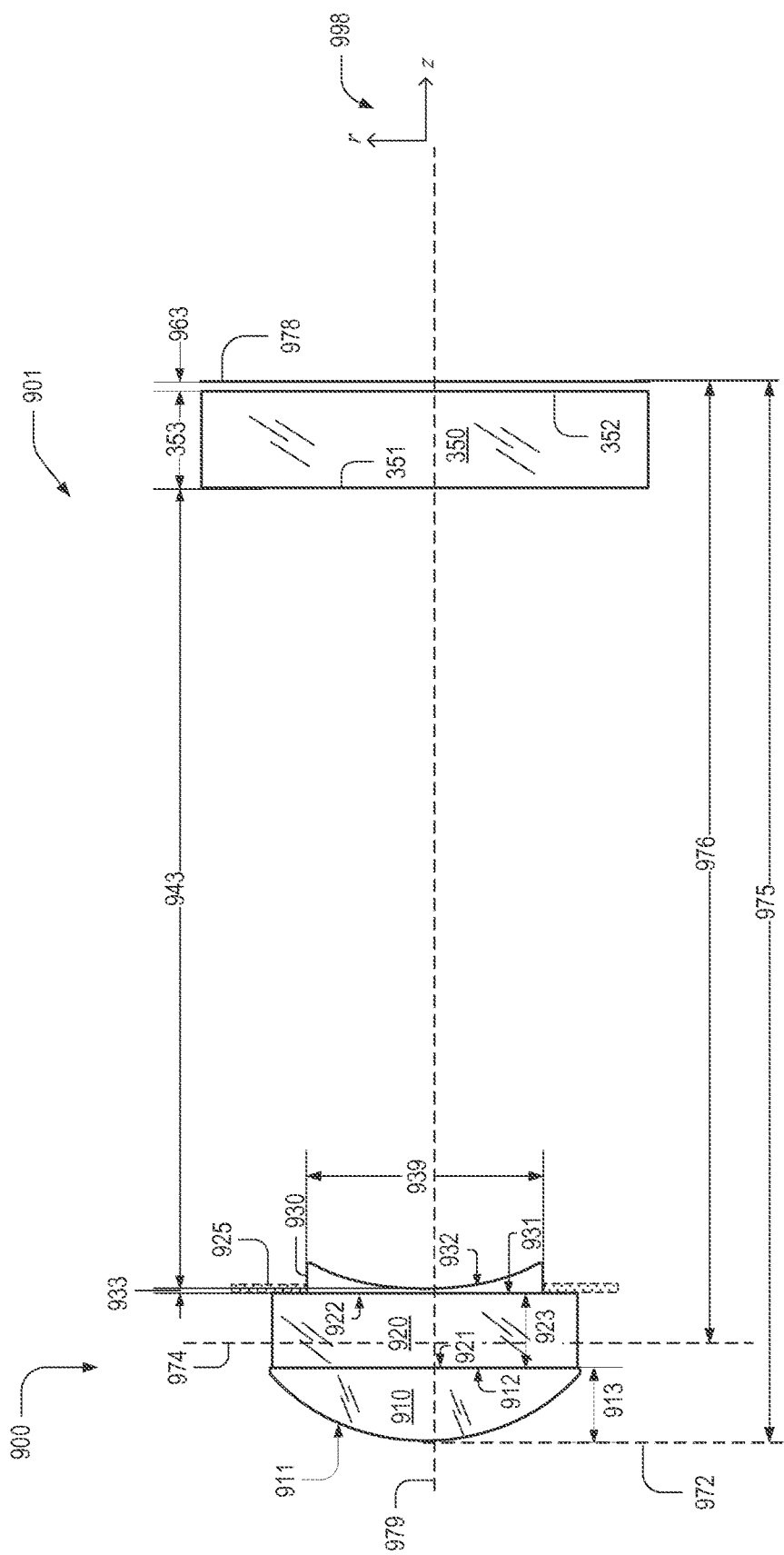
FIG. 9 is a cross-sectional view of an imaging system showing an embodiment of the two-surface narrow field-of-view compound lens, of FIGS. 1 and 2, in relationship to a coverglass of an imager.

FIG. 9 is a cross-sectional view of a two-surface narrow field-of-view compound lens 900 within an imaging system 901. Compound lens 900 is an embodiment of two-surface narrow field-of-view compound lens 200. Compound lens 900 includes a substrate 920 between a plano-convex lens 910 and a plano-concave lens 930. Substrate 920, plano-convex lens 910, and plano-concave lens 930 are embodiments of substrate 220, plano-convex lens 210, and plano-concave lens 230, respectively, of compound lens 200. Plano-convex lens 910 and plano-concave lens 930 have a common optical axis 979. Compound lens 900 has an aperture stop 925 resulting from diameter 939 of lens 930. Aperture stop 925 and diameter 939 are similar to aperture stop 225 and diameter 239 of compound lens 200. Diameter 939 equals 0.964 mm.

Plano-convex lens 910 includes a convex surface 911 and a planar surface 912. Planar surface 912 adjoins a planar surface 921 of substrate 920, which also includes a planar surface planar surface 922. Planar surface 922 adjoins a planar surface 931 of plano-concave lens 930, which also includes a concave surface 932. Surfaces 911, 912, 921, 922, 931, and 932 are embodiments of surfaces 211, 212, 221, 222, 231, and 232, respectively. In addition to including compound lens 900, imaging system 901 may also include cover glass 350.

Figure 10:
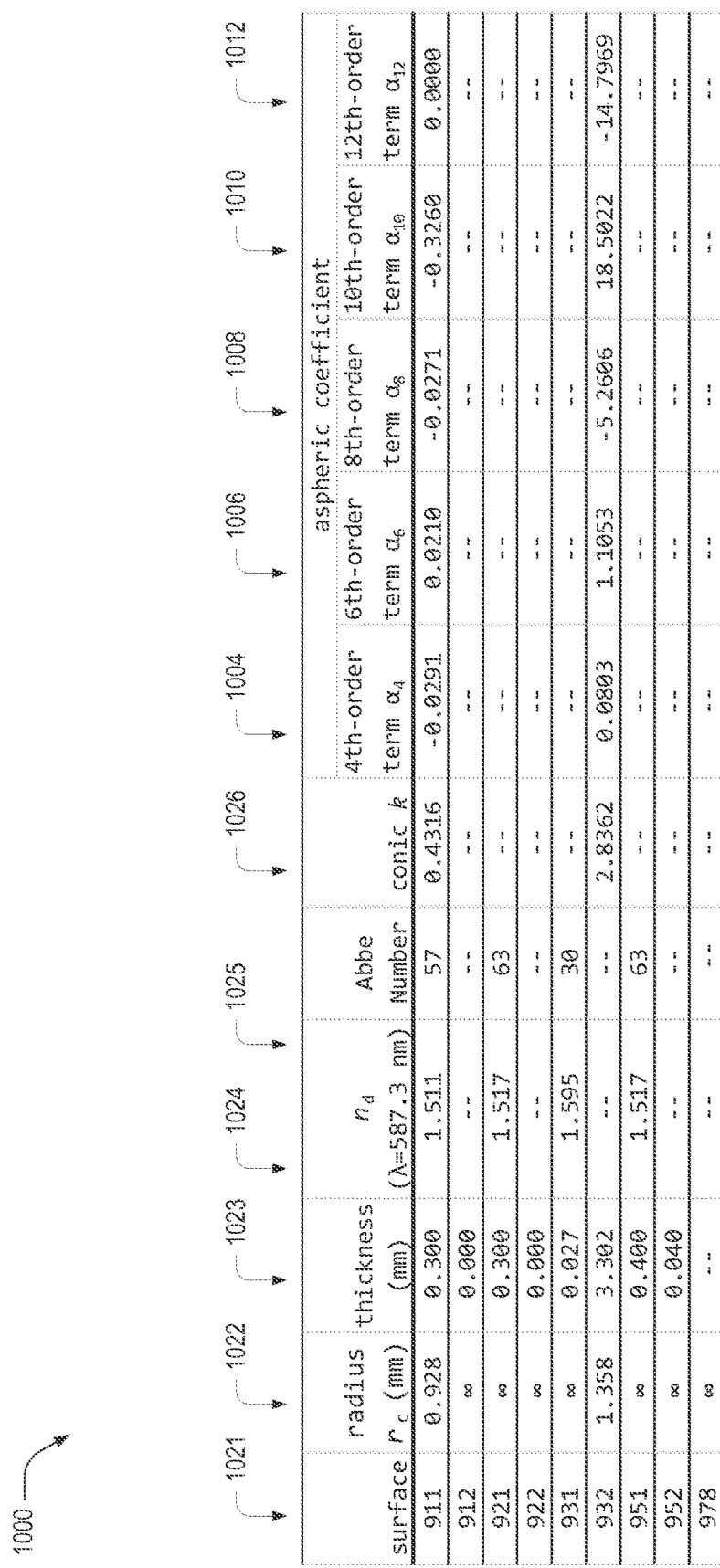
FIG. 10 shows a table of exemplary parameters of the compound lens of FIG. 9.

FIG. 10 shows a table 1000 of exemplary parameters of each surface of compound lens 900. Table 1000 includes columns 1004, 1006, 1008, 1010, 1012, and 1021-1026. Surface column 1021 denotes surfaces 911, 912, 921, 922, 931, 932, 351, 352, and image plane 978 shown in FIG. 9. Column 1023 includes on-axis thickness values, in millimeters, between adjacent surfaces of imaging system 901. Column 1023 includes center thicknesses of lens 910, substrate 920, lens 930, and cover glass 350. Specifically, lens 910 has a center thickness 913 equal to 0.33 mm, substrate 920 has a center thickness 923 equal to 0.30 mm, lens 930 has a center thickness 933, and cover glass 350 has center thickness 353. Surface 932 of plano-convex lens 930 and surface 351 of cover glass 350 are separated by a distance 943 equal to 4.120 mm. Surface 352 and image plane 948 are separated by a distance 963 equal to 0.040 mm.

It should be appreciated that imaging system 901 need not include cover glass 350, in which case parameters of compound lens 900 may be reoptimized to form an image at image plane 978 absent cover glass 350.

Surfaces 911, and 932 are defined by surface sag $z_{sag}$, Eqn. 1. Directions z and r are shown in coordinate axes 998, FIG. 9. In Eqn. 1, the parameter c is the reciprocal of the surface radius of curvature $$r_c: c = \frac{1}{r_c}.$$

Column 1022 of FIG. 10 lists $r_c$ values for surfaces 911 and 932. Parameter k denotes the conic constant, shown in column 1026. Columns 1004, 1006, 1008, 1010, and 1012 contain values of aspheric coefficients $\alpha_4$, $\alpha_6$, $\alpha_8$, $\alpha_{10}$, and $\alpha_{12}$, respectively. The units of quantities in FIG. 9 are consistent with $z_{sag}$ in Eqn. 1 being expressed in millimeters.

Column 1024 lists the material's refractive index $n_d$ at free-space wavelength λ=587.6 nm, and column 1025 lists the corresponding Abbe numbers $V_d$. Plano-convex lens 910 has refractive index $n_d$=1.511, Abbe number $V_d$=57, and includes object-side surface 911 and image-side surface 912. Substrate 920 has refractive index $n_d$=1.517, Abbe number $V_d$=63, and includes object-side surface 921 and image-side surface 922. Plano-concave lens 930 has refractive index $n_d$=1.595, Abbe number $V_d$=30, and includes object-side surface 931 and image-side surface 932.

Compound lens 900 has a total track length 975 equal to 4.369 mm, which is the sum of thickness values in column 1023 of table 1000. Referring to FIG. 9, total track length 975 is between a plane 972 and image plane 978, where plane 972 is tangent to surface 911 at optical axis 979. At free-space wavelength λ=587.6 nm, compound lens 900 has an effective focal length 976 ($f_{eff}$) equal to 4.644 mm. Principal plane 974, total track length 975 and effective focal length 976 are similar to principal plane 274, total track length 275 and effective focal length 276, respectively. The ratio of total track length 975 to effective focal length 976 equals 0.941. Compound lens 900 has a working f-number equal to 3.8 and, for an image sensor with a 1.7-mm diagonal length, a 20-degree field of view.

Plano-convex lens 910 and plano-concave lens 930 have focal lengths F1 and F2 respectively, which may be approximated using the lensmaker's equation. Referring to plano-convex lens 910, object-side surface 911 has a 0.928-mm radius of curvature, and image-side surface 312 is planar hence has an infinite radius of curvature R2. Using these radii of curvature, center thickness 913, and $n_d$=1.511, the lensmaker's equation yields F1≈1.816 mm. Referring to plano-concave lens 930, object-side surface 931 is planar and hence has an infinite radius of curvature, and image-side surface 932 has a 1.358-mm radius of curvature. Using these radii of curvature, center thickness 933, and $n_d$=1.595, the lensmaker's equation yields F2≈−2.282 mm. Ratio F2/F1≈−1.257.

FIGS. 11-14 are plots of longitudinal aberration, f-theta distortion, field curvature, and lateral color, respectively, of compound lens 900 within imaging system 901 as computed by Zemax®.

Figure 11:
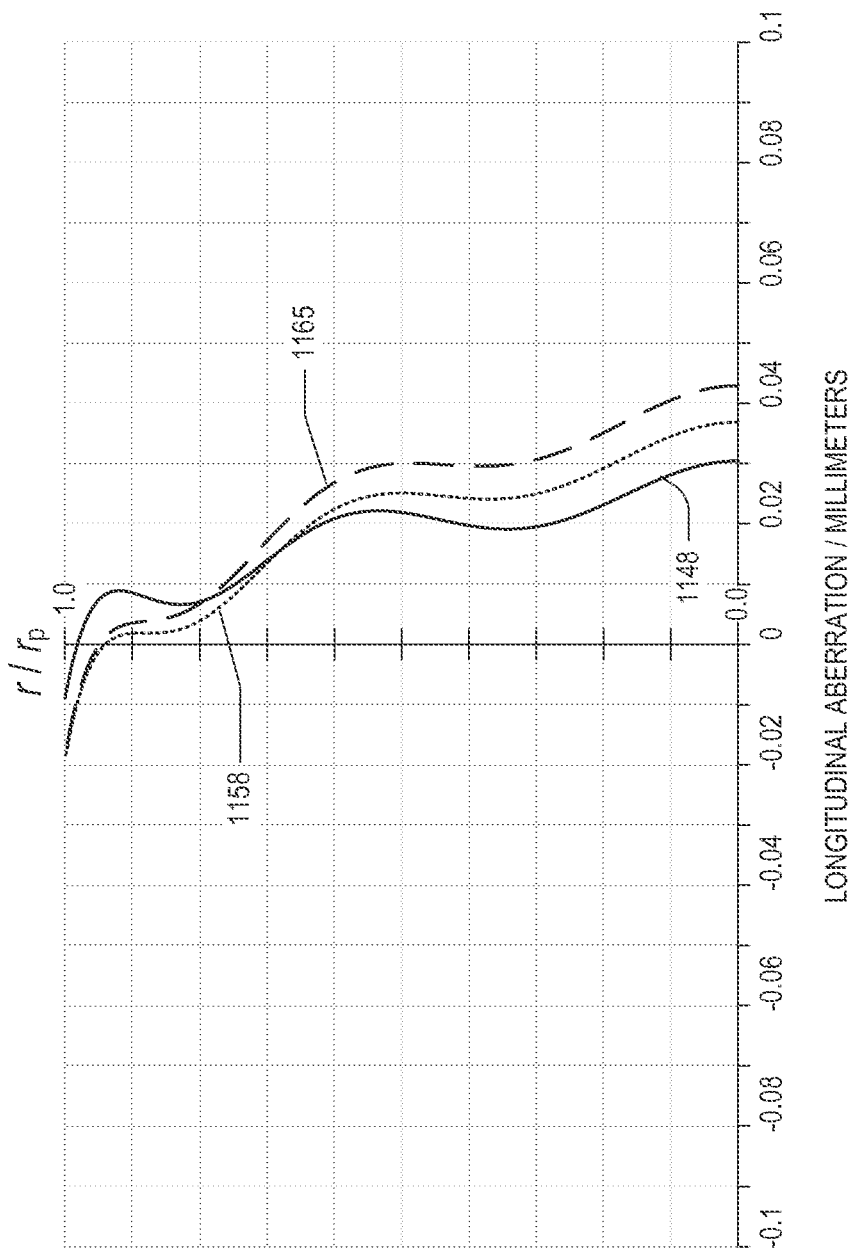
FIG. 11 is a plot of the longitudinal aberration of the compound lens within the imaging system of FIG. 9.

FIG. 11 is a plot of the longitudinal aberration of compound lens 900 within imaging system 901. In FIG. 11, longitudinal aberration is plotted in units of millimeters as a function of normalized radial coordinate $r/r_p$, where $r_p$=0.6288 mm is the maximum entrance pupil radius. Longitudinal aberration curves 1148, 1158, and 1165 are computed at the blue, green, and red Fraunhofer F-, d- and C-spectral lines.

Figure 12:
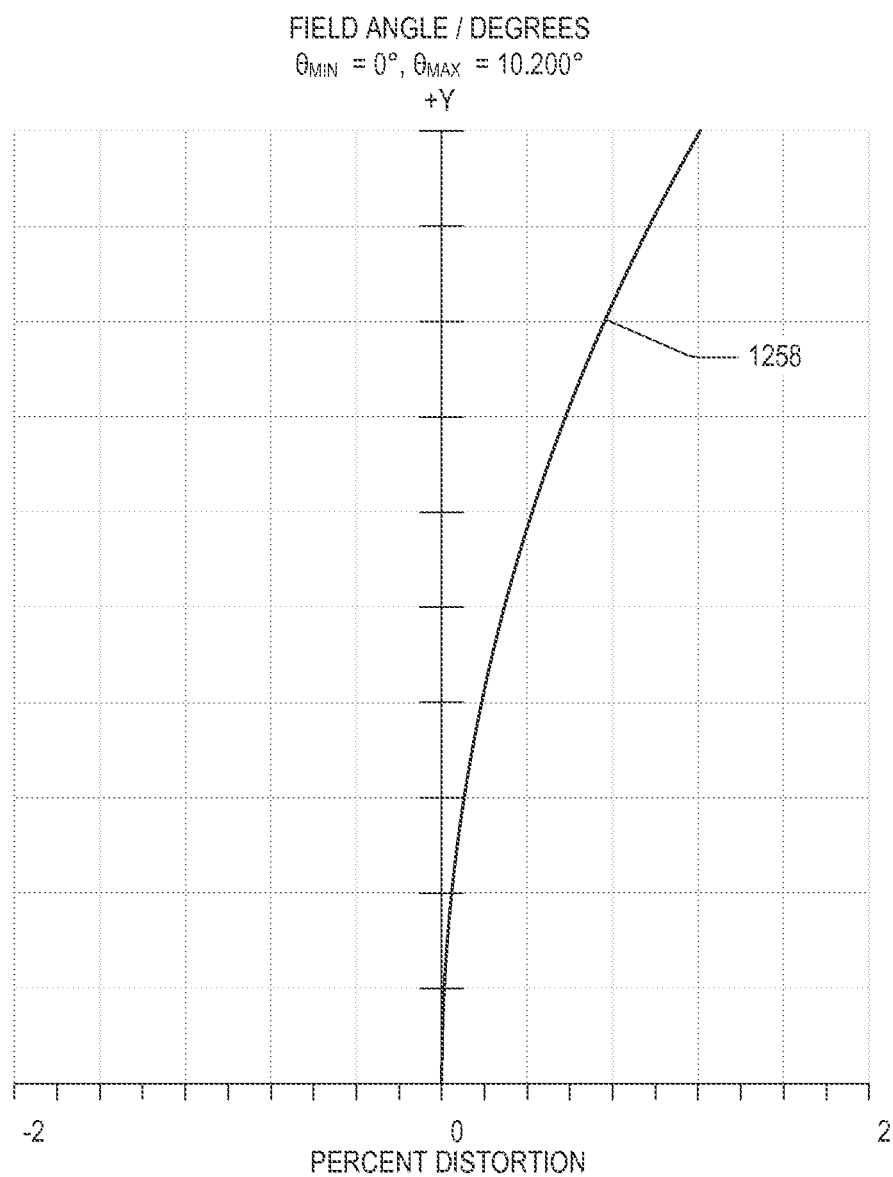
FIG. 12 is a plot of the f-theta distortion of the compound lens within the imaging system of FIG. 9.

FIG. 12 is a plot of the f-theta distortion, versus field angle, of compound lens 900 within imaging system 901. The maximum field angle plotted in FIG. 12 is $\theta_{max}$=10.200°. Distortion curve 1258 is computed at wavelength $\lambda_d$. For clarity, distortion curves corresponding to wavelength $\lambda_F$ and $\lambda_c$ are not shown, as they overlap distortion curve 658 to within its line thickness as plotted in FIG. 12.

Figure 13:
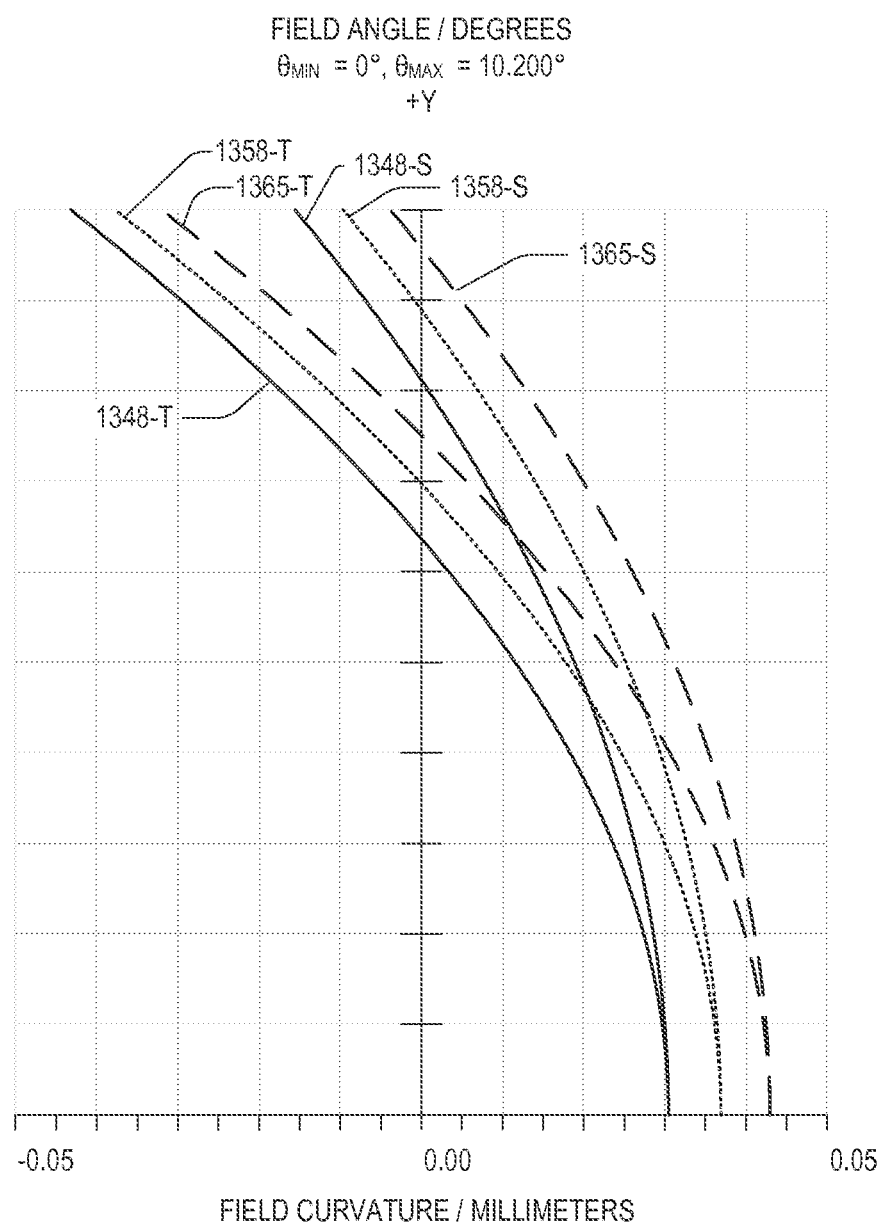
FIG. 13 is a plot of the Petzval field curvature of the compound lens within the imaging system of FIG. 9.

FIG. 13 is a plot of the Petzval field curvature, as a function of field angle, of compound lens 900 within imaging system 901. The field curvature is plotted for field angles between zero and $\theta_{max}$=10.200°. Field curvature 1348-S and field curvature 1348-T (solid lines) are computed at wavelength $\lambda_F$ in the sagittal and tangential planes, respectively. Field curvature 1358-S and field curvature 1358-T (short-dashed lines) are computed at wavelength $\lambda_d$ in the sagittal and tangential planes, respectively. Field curvature 1365-S and field curvature 1365-T (long-dashed lines) correspond to field curvature at wavelength $\lambda_C$ in the sagittal and tangential planes, respectively.

Figure 14:
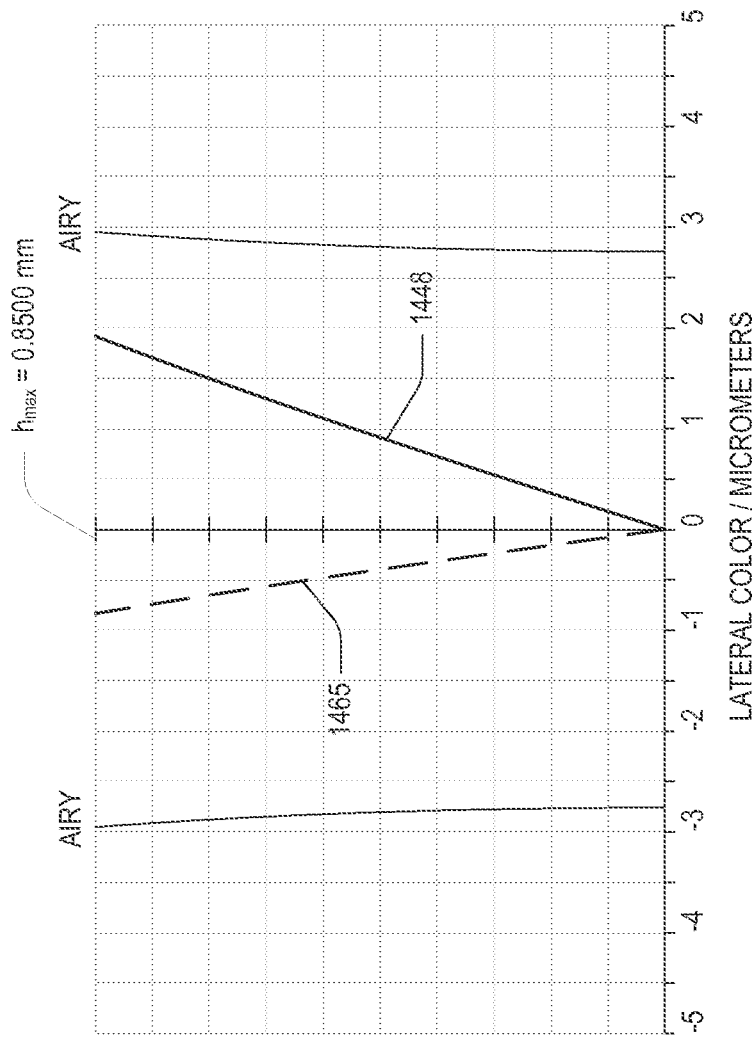
FIG. 14 is a plot of the lateral color error of the compound lens within the imaging system of FIG. 9.

FIG. 14 is a plot of the lateral color error, also known as transverse chromatic aberration, versus field height of compound lens 900 within imaging system 901. Field height ranges from $h_{min}=0$ (on-axis) to $h_{max}=0.850$ mm in image plane 978. Lateral color is referenced to $\lambda_d=587.6$ nm such that lateral color for $\lambda_d$ is zero for all field heights. Lateral color 1448 is computed at wavelength $\lambda_F$. Lateral color 1465 is computed at wavelength $\lambda_C$. The lateral color error is less than the Airy disk radius for the range of field heights evaluated.

Features described above as well as those claimed below may be combined in various ways without departing from the scope hereof. The following examples illustrate some possible, non-limiting combinations:

(A1) A two-surface narrow field-of-view (FOV) compound lens for producing an image of an object at an image plane of an imaging system may include a biplanar substrate between a plano-convex lens and a plano-concave lens having a common optical axis. The plano-convex lens has a first planar surface on a first side of the biplanar substrate and is formed of a material having a first Abbe number. The plano-concave lens has a second planar surface on a second side of the biplanar substrate opposite the first side, and is formed of a material having a second Abbe number less than the first Abbe number.

(A2) In the compound lens denoted as (A1), the first Abbe number may exceed 50 and the second Abbe number may be less than 35.

(A3) In either of the compound lenses denoted as (A1) and (A2), the biplanar substrate may be formed of a material having a third Abbe number that exceeds the second Abbe number.

(A4) In the compound lenses denoted as (A3), the third Abbe number may exceed the first Abbe number.

(A5) In any of the compound lenses denoted as (A1) through (A4), the plano-convex lens may have a focal length F1, the plano-concave lens may have a focal length F2, wherein the ratio F2/F1 satisfies $-1.4<F2/F1<-0.9$.

(A6) In any of the compound lenses denoted as (A1) through (A5), the biplanar substrate, the plano-convex lens and the plano-concave lens may collectively have an effective focal length $f_{eff}$ such that the image is formed at the image plane located a distance T from an intersection of the optical axis and an object-side convex surface of the plano-convex lens, and the ratio $T/f_{eff}$ satisfying $0.88<T/f_{eff}<0.98$.

(A7) In any of the compound lenses denoted as (A1) through (A6), second planar surface may function as an aperture stop.

(A8) In any of the compound lenses denoted as (A1) through (A7), the biplanar substrate may have a width exceeding a diameter of the second planar surface.

(A9) In any of the compound lenses denoted as (A1) through (A8), at least one of the plano-convex lens and the plano-concave lens may be singlet lens.

(A10) In any of the compound lenses denoted as (A1) through (A9), the biplanar substrate, the plano-convex lens and the plano-concave lens may collectively have an effective focal length between four millimeters and six millimeters.

(A11) Any of the compound lenses denoted as (A1) through (A10) may have an f-number between 3.5 and 5.5 for increasing a depth of field of the imaging system.

(A12) Any of the compound lenses denoted as (A1) through (A11) may further include a cover glass between the plano-concave lens and the image plane.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A two-surface narrow field-of-view (FOV) compound lens for producing an image of an object at an image plane of an imaging system, the lens comprising:
   a biplanar substrate between a plano-convex lens and a plano-concave lens having a common optical axis,
   the plano-convex lens having a first planar surface on a first side of the biplanar substrate and being formed of a material having a first Abbe number,
   the plano-concave lens having a second planar surface on a second side of the biplanar substrate opposite the first side, and being formed of a material having a second Abbe number less than the first Abbe number;
   the biplanar substrate, the plano-convex lens, and the plano-concave lens collectively having an effective focal length $f_{eff}$ such that the image is formed at the image plane of the imaging system.

2. The lens of claim 1, the first Abbe number exceeding 50, the second Abbe number being less than 35.

3. The lens of claim 1, the biplanar substrate being formed of a material having a third Abbe number that exceeds the second Abbe number.

4. The lens of claim 3, the third Abbe number exceeding the first Abbe number.

5. The lens of claim 1, the plano-convex lens having a focal length F1, the plano-concave lens having a focal length F2, the ratio F2/F1 satisfying $-1.4<F2/F1<-0.9$.

6. The lens of claim 1, the image plane of the imaging system being located a distance T from an intersection of the optical axis and an object-side convex surface of the plano-convex lens, and the ratio $T/f_{eff}$ satisfying $0.88<T/f_{eff}<0.98$.

7. The lens of claim 1, the second planar surface functioning as an aperture stop.

8. The lens of claim 1, the biplanar substrate having a width exceeding a diameter of the second planar surface.

9. The lens of claim 1, at least one of the plano-convex lens and the plano-concave lens being a singlet lens.

10. The lens of claim 1, the biplanar substrate, the plano-convex lens and the plano-concave lens collectively having an effective focal length between four millimeters and six millimeters.

11. The lens of claim 1, having an f-number between 3.5 and 5.5 for increasing a depth of field of the imaging system.

12. The lens of claim 1, the imaging system including a cover glass between the lens and the image plane.

13. A two-surface narrow field-of-view (FOV) compound lens for producing an image of an object at an image plane of an imaging system, the lens comprising:
   a biplanar substrate between a plano-convex lens and a plano-concave lens having a common optical axis,
   the plano-convex lens having a first planar surface on a first side of the biplanar substrate, and being formed of a material having a first Abbe number exceeding 50,
   the plano-concave lens having a second planar surface on a second side of the biplanar substrate opposite the first side, and being formed of a material having a second Abbe number less than 35, the plano-convex lens having a focal length F1, the plano-concave lens having a focal length F2, the ratio F2/F1 satisfying $-1.4 < F2/F1 < -0.9$, the biplanar substrate, the plano-convex lens and the plano-concave lens collectively having an effective focal length $f_{eff}$ such that the image is formed at the image plane located a distance T from an intersection of the optical axis and an object-side convex surface of the plano-convex lens, and the ratio $T/f_{eff}$ satisfying $0.88 < T/f_{eff} < 0.98$.

14. The lens of claim 13, the biplanar substrate being formed of a material having a third Abbe number that exceeds the second Abbe number.

15. The lens of claim 13, the second planar surface functioning as an aperture stop.

16. The lens of claim 13, the biplanar substrate having a width exceeding a diameter of the second planar surface.

17. The lens of claim 13, the plano-convex lens and the plano-concave lens each being singlet lenses.

18. The lens of claim 13, the biplanar substrate, the plano-convex lens and the plano-concave lens collectively having an effective focal length $f_{eff}$ between four millimeters and six millimeters.

19. The lens of claim 13, having an f-number between 3.5 and 5.5 for increasing a depth of field of the imaging system.

20. The lens of claim 13, further comprising a cover glass between the plano-concave lens and the image plane.

* * * * *